US010220724B2

(12) United States Patent
Kim

(10) Patent No.: US 10,220,724 B2
(45) Date of Patent: Mar. 5, 2019

(54) SYSTEM AND METHOD FOR CONTROLLING START OF FUEL CELL VEHICLE

(71) Applicant: Hyundai Motor Company, Seoul (KR)

(72) Inventor: Dae Jong Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/297,392

(22) Filed: Oct. 19, 2016

(65) Prior Publication Data

US 2017/0305297 A1 Oct. 26, 2017

(30) Foreign Application Priority Data

Apr. 26, 2016 (KR) .......................... 10-2016-0051163

(51) Int. Cl.
*B60L 11/18* (2006.01)
*H01M 8/04302* (2016.01)
*H01M 8/0432* (2016.01)
*H01M 8/04746* (2016.01)
*H01M 8/04858* (2016.01)
(Continued)

(52) U.S. Cl.
CPC ......... *B60L 11/1888* (2013.01); *B60L 11/189* (2013.01); *H01M 8/0488* (2013.01); *H01M 8/04302* (2016.02); *H01M 8/04365* (2013.01); *H01M 8/04567* (2013.01); *H01M 8/04753* (2013.01); *H01M 8/04873* (2013.01); *H01M 8/04992* (2013.01); *H01M 16/006* (2013.01); *H02P 1/04* (2013.01); *H02P 6/14* (2013.01);
(Continued)

(58) Field of Classification Search
CPC ........... B60L 11/1888; H01M 2250/20; H01M 8/04302; H01M 8/04992; H02P 1/04
See application file for complete search history.

(56) References Cited

U.S. PATENT DOCUMENTS

| 8,512,904 B2 * | 8/2013 | Oh ...................... H01M 8/0267 429/408 |
| 2012/0053766 A1 * | 3/2012 | Ham ...................... B60L 3/0053 701/22 |

(Continued)

FOREIGN PATENT DOCUMENTS

| JP | 2007-165055 A | 6/2007 |
| JP | 2007-172951 A | 7/2007 |

(Continued)

*Primary Examiner* — Muhammad S Islam
(74) *Attorney, Agent, or Firm* — Mintz Levin Cohn Ferris Glovsky and Popeo, P.C.; Peter F. Corless

(57) ABSTRACT

A system and method for controlling a start of a fuel cell vehicle are provided. The method includes supplying hydrogen and air to a fuel cell and operating a converter so that a voltage on a high-voltage bus is constant, wherein the converter is disposed between a high-voltage battery and the high-voltage bus which is connected to an output terminal of the fuel cell. The voltage on the high-voltage bus is maintained at a preset lowest control voltage and the voltage on the high-voltage bus is adjusted based on a result comparing a preset lower-limit operational voltage of an inverter with an inverter detection voltage. The inverter is disposed between the high-voltage bus and a drive motor, and the inverter detection voltage is detected on a terminal of the inverter which is connected to the high-voltage bus.

7 Claims, 2 Drawing Sheets

(51) Int. Cl.
  *H01M 8/04992* (2016.01)
  *H02P 1/04* (2006.01)
  *H02P 6/14* (2016.01)
  *H01M 16/00* (2006.01)
  *H01M 8/04537* (2016.01)

(52) U.S. Cl.
  CPC ...... *H01M 8/0432* (2013.01); *H01M 2250/20* (2013.01); *Y02T 90/32* (2013.01)

(56) References Cited

U.S. PATENT DOCUMENTS

| | | | |
|---|---|---|---|
| 2012/0083940 A1* | 4/2012 | Mori | B60L 11/1881 700/298 |
| 2012/0205974 A1* | 8/2012 | McCaslin | H02J 3/385 307/18 |
| 2015/0336471 A1* | 11/2015 | Yoon | H01M 8/04626 701/22 |

FOREIGN PATENT DOCUMENTS

| | | |
|---|---|---|
| JP | 2009-123599 A | 6/2009 |
| JP | 2009-159689 A | 7/2009 |
| JP | 2009-225522 A | 10/2009 |
| JP | 2010-259281 A | 11/2010 |
| JP | 2011-250656 A | 12/2011 |
| JP | 2012-235628 A | 11/2012 |
| JP | 2015-021861 A | 2/2015 |
| JP | 2015-224975 A | 12/2015 |
| KR | 10-2008-0037223 A | 4/2008 |
| KR | 10-2010-0035182 A | 4/2010 |
| KR | 10-2012-0061663 A | 6/2012 |
| KR | 10-1351349 | 1/2014 |
| KR | 10-2014-0078948 A | 6/2014 |
| KR | 10-2015-0043613 A | 4/2015 |
| KR | 10-2015-0051271 A | 5/2015 |
| KR | 10-2015-0071821 A | 6/2015 |
| KR | 2015-0078448 A | 7/2015 |
| KR | 10-2016-0035743 A | 4/2016 |

* cited by examiner

SYSTEM AND METHOD FOR CONTROLLING START OF FUEL CELL VEHICLE

CROSS REFERENCE TO RELATED APPLICATION

The present application claims priority to Korean Patent Application No. 10-2016-0051163, filed Apr. 26, 2016, the entire contents of which is incorporated herein for all purposes by this reference.

BACKGROUND

Field of the Invention

The present invention relates to a system and method for controlling a start of a fuel cell vehicle, and more particularly, to a method for controlling a start of a fuel cell, which achieves rapid startability (e.g., ability to start) during a cold start by performing constant voltage control on a fuel cell to output a lowest voltage within an allowable range.

Description of the Related Art

When a cold start or a low-temperature start is performed, operating a fuel cell to produce low voltage and high current is advantageous in increasing the temperature of the fuel cell. In other words, when a fuel cell is operated to output a lowest voltage allowable by a system while maintaining constant output power, the fuel cell outputs a maximum current, whereby the temperature of the fuel cell may be rapidly increased.

In an actual fuel cell vehicle system, a fuel cell, a converter configured to convert the voltage of a high-voltage battery, and an inverter configured to drive a motor are connected with each other via a high-voltage bus. Particularly, the fuel cell may maintain a low voltage by performing constant voltage control on the converter to maintain the allowable minimum voltage during a cold start, whereby a rapid temperature increase may be achieved. However, when such constant voltage operation is actually performed, there may be a difference between converter control voltage for operating a converter and actually measured voltage, such as inverter detection voltage, which is actually measured in an inverter, or fuel cell voltage, which is acquired by actually measuring the voltage of the fuel cell. This difference may occur since each of the components individually measures a voltage using a different voltage sensor.

For example, even when constant voltage control is performed on the high-voltage bus by operating a converter using the converter control voltage that corresponds to the lowest operation voltage to increase the temperature of a fuel cell during a cold start, the voltage measured by a voltage sensor installed in an inverter or in the fuel cell may be less than or greater than the converter control voltage. Even when the voltage of the fuel cell is less than or greater than the actual voltage of the converter, it may not affect the operation since it is not a control factor used for operating the system. However, components such as a low-voltage direct current-direct current (DC/DC) converter (LDC), an air blower, a cooling-water pump, an inverter, and the like may be affected by the voltage of a high-voltage bus in a fuel cell vehicle system. Therefore, even when a rapid temperature increase is required during a cold start, the voltage on the high-voltage bus must be maintained above a lower limit voltage capable of the normal operation of these components.

Particularly, an inverter, which contributes to the increase of temperature in constant voltage operation, has a lower-limit operational voltage that enables the normal operation thereof from the aspect of design. Although a converter outputs sufficient power to satisfy the lower-limit operational voltage of an inverter, when a voltage sensor installed in the inverter detects that the voltage of the inverter is less than the lower-limit operational voltage thereof, the inverter performs emergency operation to decrease an output power. When such an emergency operation situation occurs when constant voltage control is being performed during a cold start, the output power consumed by the fuel cell decreases, thus retarding or halting the temperature increase. Conversely, even though the output power of the converter maintains the lower-limit operational voltage of an inverter, a voltage sensor installed in the inverter may detect that the voltage of the inverter is greater than the lower-limit operational voltage thereof. In particular, even when the voltage may be decreased, operation is performed while maintaining a greater voltage than needed, and thus more power may be output to achieve the temperature increase.

The foregoing is intended merely to aid in the understanding of the background of the present invention, and is not intended to mean that the present invention falls within the purview of the related art that is already known to those skilled in the art.

SUMMARY

Accordingly, an object of the present invention is to provide a system and method for controlling a start of a fuel cell vehicle, which may reduce the time taken to prepare a start of a fuel cell vehicle system through a rapid temperature increase of the fuel cell by performing constant voltage control on the fuel cell to output a lowest voltage within an allowable range during a cold start or a low-temperature start.

In order to achieve the above object, the present invention provides a method for controlling a start of a fuel cell vehicle, which may include supplying, by a controller, hydrogen and air to a fuel cell; operating, by the controller, a converter to maintain a voltage on a high-voltage bus constant, wherein the converter may be disposed between a high-voltage battery and the high-voltage bus connected to an output terminal of the fuel cell, and the voltage on the high-voltage bus may be maintained at a preset lowest control voltage; and adjusting, by the controller, the voltage on the high-voltage bus based on a result of a comparison of a preset lower-limit operational voltage of an inverter with an inverter detection voltage, wherein the inverter may be disposed between the high-voltage bus and a drive motor, and the inverter detection voltage may be detected on a terminal of the inverter connected to the high-voltage bus.

In an exemplary embodiment of the present invention, the operating of the converter may include setting the lowest control voltage to a total of the lower-limit operational voltage of the inverter and a preset offset value. In addition, the adjusting of the voltage may include adjusting the voltage on the high-voltage bus using a voltage acquired by adding a voltage difference between the inverter detection voltage and the lower-limit operational voltage to the lowest control voltage or by subtracting the voltage difference from the lowest control voltage.

Further, the adjusting of the voltage may include detecting and cumulatively adding the voltage difference between the inverter detection voltage and the lower-limit operational voltage at regular intervals, to calculate an average voltage difference by dividing the cumulatively added voltage difference by a total number of times of the detecting, and to adjust the voltage on the high-voltage bus using a voltage acquired by adding the average voltage difference to the lowest control voltage or by subtracting the average voltage difference from the lowest control voltage.

The adjusting of the voltage may further include determining whether a value acquired by subtracting the lower-limit operational voltage from the inverter detection voltage is greater than a preset reference value, which is a positive value; when the value acquired by the subtracting is greater than the preset reference value, cumulatively adding the value acquired by the subtracting a first reference number of times, which is set in advance; calculating an average value by dividing the cumulatively added value by the first reference number of times; and operating the converter to adjust the voltage on the high-voltage bus to a value acquired by subtracting the average value from the lowest control voltage. The reference value may be less than the offset value.

In an exemplary embodiment of the present invention, the adjusting of the voltage may further include, when the value acquired by the subtracting is less than the reference value, determining whether the value acquired by the subtracting is a negative value; when the value acquired by the subtracting is a negative value, cumulatively adding the value acquired by the subtracting a second reference number of times, which is set in advance; calculating an average value by dividing the cumulatively added value by the second reference number of times; and operating the converter to change the voltage on the high-voltage bus to a value acquired by subtracting the average value from the lowest control voltage. The second reference number of times may be less than the first reference number of times. The operating of the converter to adjust the voltage on the high-voltage bus may also include maintaining the voltage on the high-voltage bus when the value acquired by the subtracting is less than the reference value and is a positive value.

According to the above-mentioned method for controlling a start of a fuel cell vehicle, when setting the control voltage of a converter, connected with a fuel cell and an inverter via a high-voltage bus, an offset value for adding a margin to the lower-limit operational voltage of the inverter may be adjusted based on the voltage detected in the inverter, whereby the fuel cell may maintain a lowest voltage within the range that may satisfy the lower-limit operational voltage of the inverter. Additionally, according to the method for controlling a start of a fuel cell vehicle, a fuel cell may be induced to maximally generate heat during a cold start or a low-temperature start, thus reducing the time taken to start the fuel cell vehicle when the cold start or the low-temperature start is performed.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Figure 1:
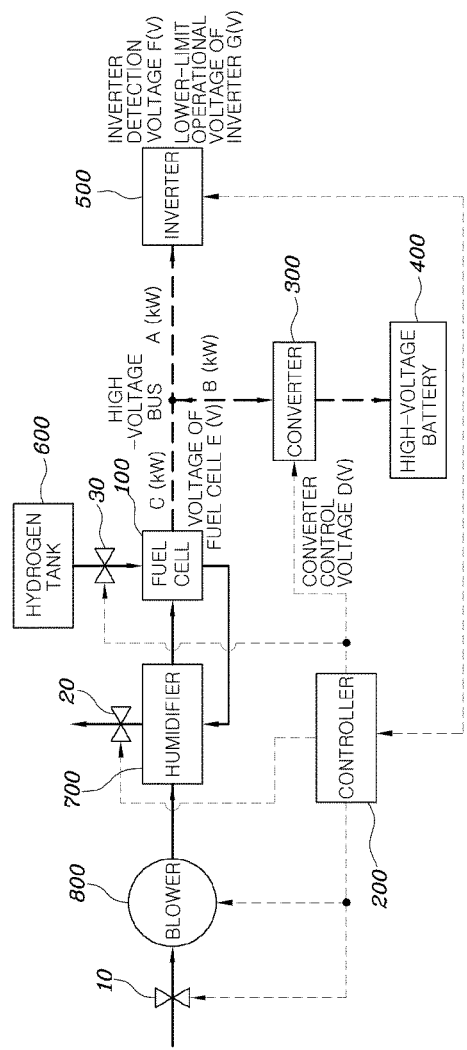
FIG. 1 is a block diagram illustrating a fuel cell vehicle system to which a method for controlling a start of a fuel cell vehicle according to an exemplary embodiment of the present invention is applied.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a method for controlling a start of a fuel cell vehicle according to various exemplary embodiments of the present invention will be described with reference to the accompanying drawings.

FIG. 1 is a block diagram illustrating a fuel cell vehicle system to which a method for controlling a start of a fuel cell vehicle according to an exemplary embodiment of the present invention is applied. Referring to FIG. 1, a fuel cell vehicle system to which a method for controlling a start of a fuel cell vehicle according to an exemplary embodiment of the present invention is applied may include a fuel cell 100, a fuel cell system that includes various components for supplying fuel and air to the fuel cell 100, a converter 300 electrically connected with the fuel cell 100 via a high-voltage bus, a high-voltage battery 400 configured to transmit and receive power to and from the high-voltage bus via the converter 300, an inverter 500 configured to convert direct current (DC) power, supplied by being connected to the high-voltage bus, into alternating current (AC) power and supplying the AC power to a motor, and a controller 200 configured to operate the fuel cell system, the converter, and the inverter.

As an example of the components of the fuel cell system, FIG. 1 illustrates an air supply valve 10, a blower 800 configured to generate high-pressure air by compressing the air supplied by the air supply valve 10, a humidifier 700 configured to supply moisture to the high-pressure air, an air discharge valve 20 configured to discharge air to the outside of a vehicle after the reaction in the fuel cell 100, a hydrogen tank 600 configured to store hydrogen, which is the fuel of the fuel cell, and a hydrogen supply valve 30 configured to adjust the supply of hydrogen supplied from the hydrogen tank 600 to the fuel cell 100.

In the fuel cell vehicle system configured as described above, for a motor to consume power by intrinsically generating heat during a cold start, the inverter 500 may be configured to supply power to the motor by being supplied with the power from the high-voltage bus. The power consumed by the motor is denoted by 'A'. In particular, power 'C' and 'B', respectively output from the fuel cell 100 and the converter 300, may be supplied to the high-voltage bus (A=B+C). From the aspect of increasing the temperature of a fuel cell, 'C' may be maximized when the high-voltage battery 400 is charged as high as possible (e.g., when 'B' is a negative value), which may be advantageous in increasing the temperature of the fuel cell 100.

Figure 2:
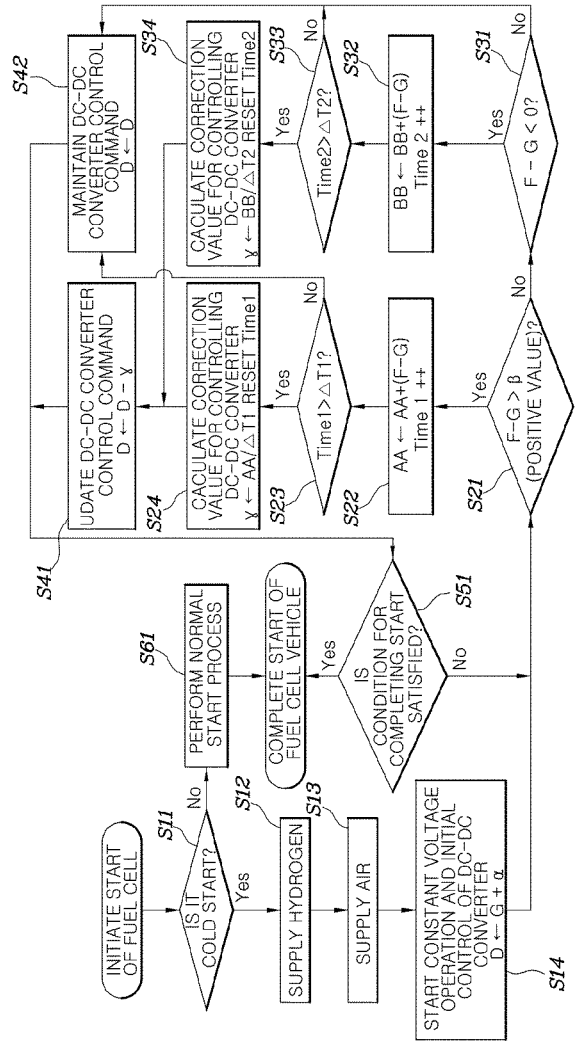
FIG. 2 is a flowchart illustrating a method for controlling a start of a fuel cell vehicle according to an exemplary embodiment of the present invention.

Furthermore, when the fuel cell 100 is capable of being operated to produce a lowest voltage E allowable in the system, the operation point corresponds to the point at which the heating rate is maximized. In an exemplary embodiment of the present invention, considering the lower-limit operational voltage G of an inverter, which contributes to the increase of temperature by supplying power to the motor that consumes the power, the voltage E of the fuel cell 100 may be maintained at the lower-limit operational voltage G of the inverter, whereby the rapid start of a fuel cell vehicle during a cold start may be achieved FIG. 2 is a flowchart illustrating a method for controlling a start of a fuel cell vehicle according to an exemplary embodiment of the present invention. Referring to FIG. 2, the method for controlling a start of a fuel cell vehicle according to an exemplary embodiment of the present invention may include supplying, by a controller 200, hydrogen and air to a fuel cell 100 (S12 and S13); performing, by the controller 200, constant voltage control (S14) to maintain the voltage on a high-voltage bus of a converter 300, disposed between a high-voltage battery and the high-voltage bus, connected to the output terminal of the fuel cell 100, at a preset lowest control voltage; and adjusting, by the controller 200, the voltage on the high-voltage bus of the converter 300 (S21 to S24, S31 to S34, S41, and S42) based on a result of the comparison of the preset lower-limit operational voltage G of an inverter 500 with an inverter detection voltage F, detected on the high-voltage bus of the inverter 500, configured to convert the voltage of the high-voltage bus and supply the voltage to a drive motor.

First, when the fuel cell 100 is started, the controller 200 may be configured to determine whether it is a cold start at step S11 using the temperature of the fuel cell 100 or the like. In particular, the controller 200 may be configured to determine the cold start by receiving a value sensed by a temperature sensor of the fuel cell 100 or the like. In response to determining at step S11 that it is not a cold start, the controller 200 may perform a normal process for starting the fuel cell at step S61, whereby the start of the fuel cell vehicle is completed.

Meanwhile, when the controller 200 detects a cold start, the controller 200 may be configured to begin supplying hydrogen and air to the fuel cell 100 at steps S12 and S13. For example, the controller 200 may be configured to enable hydrogen and air to be supplied to the fuel cell 100 by opening the hydrogen supply valve 30 and the air supply valve 10. In other words, at steps S12 and S13, the controller 200 may be configured to open the air supply valve 10 and the hydrogen supply valve 30 at the side of hydrogen tank 600. Subsequently, the controller 200 may be configured to set the control voltage D on the high-voltage bus of the converter 300, disposed between the high-voltage bus and the high-voltage battery 400, to a preset lowest control voltage at step S14.

As described above, an exemplary embodiment of the present invention controls a cold start in consideration of the lower-limit operational voltage G of the inverter 500, which contributes to the increase of temperature by supplying power to a motor that consumes power. The lowest control voltage D, which is set at step S14, may be determined by the total of the lower-limit operational voltage G of the inverter and a preset offset value (that is, $D=G+\alpha$, $\alpha$ denoting the preset offset value). In other words, at step S14, the controller may be configured to set the total of the lower-limit operational voltage G of the inverter 500 and the preset offset value $\alpha$ as the converter control voltage D.

Particularly, the preset offset value $\alpha$ may be set to prevent the output power for increasing temperature from decreasing. Specifically, the inverter detection voltage F, detected on the high-voltage bus of the inverter 500, may contain an error, but this may not be detected in the initial phase of a cold start. When the inverter detection voltage F is detected to be less than the lower-limit operational voltage G of the inverter, the inverter 500 may be configured to enter an emergency operation mode, thus reducing the output power for increasing the temperature. Therefore, the preset offset value $\alpha$ may be set to prevent this situation. The offset value $\alpha$ may vary based on the system. In other words, it may be set according to the characteristics of the corresponding system through experimentation.

Using the converter control voltage D, set through the above-described process, constant voltage control, by which the voltage on the high-voltage bus may be maintained consistent, may be performed. Subsequently, when constant voltage control is started, the voltage on the high-voltage bus of the converter 300 may be adjusted based on the result of the comparison of the inverter detection voltage F with the preset lower-limit operational voltage G of the inverter. In other words, the controller may be configured to adjust the converter control voltage D to approach the lower-limit operational voltage G of the inverter by adding a difference between the inverter detection voltage F and the lower-limit operational voltage G of the inverter to the converter control voltage D or by subtracting the difference from the converter control voltage D, whereby the temperature increase achieved through power consumption may be maximized during a cold start.

Particularly, in an exemplary embodiment of the present invention, to prevent rapid variation in the converter control voltage D, the controller 200 may be configured to detect and cumulatively add a voltage difference between the inverter detection voltage F and the lower-limit operational voltage G of the inverter at preset regular intervals, and may be configured to calculate an average voltage difference by dividing the cumulatively added voltage difference by the total number of times that the detection is performed. Then, the voltage on the high-voltage bus of the converter 300 (e.g., the converter control voltage D) may be adjusted using the voltage acquired by adding the average voltage difference to the previous lowest control voltage of the converter 300 or by subtracting the average voltage difference from the previous lowest control voltage of the converter 300.

Additionally, in another exemplary embodiment of the present invention, the control method illustrated in FIG. 2 may be performed for more accurate control. In the exemplary embodiment shown in FIG. 2, different control methods may be performed respectively for the case in which a value, calculated by subtracting the lower-limit operational voltage G of the inverter from the inverter detection voltage F, is a positive value and for the case in which the value is a negative value.

When constant voltage operation is initiated based on the converter control voltage D, which has been set at step S14, the controller 200 may be configured to subtract the preset lower-limit operational voltage G of the inverter from the inverter detection voltage F, detected on the high-voltage bus of the inverter 500, and determine at step S21 or S31 whether the value acquired by the subtraction is greater than a preset reference value ($\beta$: a positive value) or whether the value is a negative value. The preset reference value ($\beta$: a positive value) may be applied for a purpose similar to the purpose of the above-mentioned offset value $\alpha$ and may be set in consideration of the minimum margin allowable in the process of detecting the voltage on the high-voltage bus of the inverter 500. Since the present invention intends to adjust the converter control voltage D more accurately than when using the tolerance allowable by the preset offset value, the preset reference value $\beta$ may be set to a positive value that is less than the offset value $\alpha$.

At step S21, when the value of (F−G) is greater than the preset reference value $\beta$, the controller 200 may be configured to cumulatively add the value of (F−G) at step S22. At step S22, the number of times Time1 that the value of (F−G) is cumulatively added may be counted. The process of determining and cumulatively adding the value of (F−G) may be performed at preset regular intervals, and the number of times Time1 that this process is performed may be counted. Accordingly, when the counted number of times is equal to or greater than a preset reference number of times $\Delta$T1, the average of the cumulatively added value may be calculated. In other words, the controller 200 may be configured to determine at step S23 whether the number of times Time1 that the value of (F−G) is cumulatively added by performing step S22 is equal to or greater than the preset reference number of times.

Subsequently, in response to determining at step S23 that the number of times Time1 that the value of (F−G) is cumulatively added is equal to or greater than the preset reference number of times, the controller 200 may be configured to calculate a correction value $\gamma$ at step S24 by dividing the cumulatively added value by the counted number of times and set a new converter control voltage at step S41 by subtracting the correction value $\gamma$ from the previous control voltage D of the converter 300.

Meanwhile, in response to determining at step S23 that the number of times that the value of (F−G) is cumulatively added is less than the preset reference number of times, the controller 200 may be configured to maintain the previous control voltage D of the converter 300 at step S42. Subsequently, after performing step S41 or S42, the controller 200 may be configured to determine whether a condition for completing a cold start is satisfied in consideration of the temperature of a fuel cell 100 or the like at step S51, and complete the startup when the condition is satisfied. When the condition is not satisfied, the controller 200 may repeat the process of determining the value of (F−G).

As described above, when constant voltage operation is initiated based on the converter control voltage D, which has been set at step S14, the controller 200 may be configured to subtract the preset lower-limit operational voltage G of the inverter from the inverter detection voltage F, detected on the high-voltage bus of the inverter 500, and determine at step S21 or S31 whether the value acquired through the subtraction is greater than a preset reference value ($\beta$: a positive value) or whether the value is a negative value.

At step S21, when the value of (F−G) is less than the preset reference value $\beta$, the controller 200 may be configured to determine whether the value of (F−G) is a negative value. When the value of (F−G) is not a negative value (e.g., is a positive value), the controller 200 may be configured to maintain the previous converter control voltage D at step S42. Conversely, when the value of (F−G) is a negative value, the controller 200 may be configured to cumulatively add the value of (F−G). At step S32, the controller 200 may be configured o cumulatively add the value of (F−G) and count the number of times that the value of (F−G) is cumulatively added.

Furthermore, at step S33, the controller may be configured to determine whether the number of times Time2 that the value of (F−G) is cumulatively added by performing step S32 is equal to or greater than a preset reference number of times $\Delta$T2. In particular, the preset reference number of times $\Delta$T2 may be less than the reference number of times $\Delta$T1, which is used for control performed when the value of (F−G) is a positive number. When the value of (F−G) is a negative number corresponds to when the inverter 500 is operating in an emergency mode and the output power of the inverter 500 may decrease since the inverter detection voltage F is less than the lower-limit operational voltage G of the inverter. Therefore, the number of times $\Delta$T2 may be set to be low to minimize entry into a section in which the inverter decreases the output power.

Subsequently, in response to determining at step S33 that the number of times that the value of (F−G) is cumulatively added is equal to or greater than the preset reference number of times $\Delta$T2, the controller 200 may be configured to calculate a correction value $\gamma$ at step S34 by dividing the cumulatively added value by the counted number of times and set a new converter control voltage at step S41 by subtracting the correction value $\gamma$ from the previous control voltage D of the converter 300.

In response to determining at step S33 that the number of times that the value of (F−G) is cumulatively added is less than the preset reference number of times, the controller 200 may be configured to maintain the previous control voltage D of the converter 300 at step S42. Subsequently, after performing step S41 or S42, the controller 200 may be configured to determine whether a condition for completing a cold start is satisfied based on the temperature of a fuel cell 100 or the like at step S51, and complete the startup when the condition is satisfied. When the condition is not satisfied, the controller 200 may be configured to repeat the process of determining the value of (F−G).

Moreover, in the above-mentioned step S22, the number of times Time2 counted at step S32 may be reset to 0. Additionally, at step S32, the number of times Time1, counted at step S22, may be reset to 0. Accordingly, the converter control voltage D may be changed or adjusted using the cumulatively added value and the average thereof when the value of (F−G) is maintained at a constant value that is equal to or greater than the reference value β or that is a negative value.

As described above, various exemplary embodiments of the present invention may induce a fuel cell to maximally generate heat during a cold start or a low-temperature start by performing constant voltage operation to enable the output voltage of the fuel cell to be maintained at a lowest value within the range allowable by the lower-limit operational voltage of an inverter, which supplies power to a drive motor of a fuel cell vehicle. Specifically, when setting the control voltage of a converter, connected with a fuel cell and an inverter via a high-voltage bus, the controller may be configured to adjust an offset value for adding a margin to the lower-limit operational voltage of an inverter based on the voltage detected in the inverter, whereby the output voltage of a fuel cell may be maintained at a lowest value within the range allowable by the lower-limit operational voltage of an inverter. Accordingly, the fuel cell may be induced to maximally generate heat during a cold start or a low-temperature start.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method for controlling a start of a fuel cell vehicle, comprising:
   supplying, by a controller, hydrogen and air to a fuel cell;
   operating, by the controller, a converter to maintain a voltage on a high-voltage bus of the converter constant, wherein the converter is disposed between a high-voltage battery and the high-voltage bus connected to an output terminal of the fuel cell, and the voltage on the high-voltage bus is maintained at a preset lowest control voltage; and
   adjusting, by the controller, the voltage on the high-voltage bus using a voltage acquired by adding a voltage difference between an inverter detection voltage and a preset lower-limit operational voltage to the preset lowest control voltage or by subtracting the voltage difference from the preset lowest control voltage,
   wherein the inverter is disposed between the high-voltage bus and a drive motor, and the inverter detection voltage is detected on a terminal of the inverter which is connected to the high-voltage bus, and
   wherein the method further comprises:
   detecting and cumulatively adding, by the controller, the voltage difference between the inverter detection voltage and the preset lower-limit operational voltage at regular intervals;
   calculating, by the controller, an average voltage difference by dividing the cumulatively added voltage difference by a total number of times of the detecting of the voltage difference; and
   adjusting, by the controller, the voltage on the high-voltage bus using a voltage acquired by adding the average voltage difference to the preset lowest control voltage or by subtracting the average voltage difference from the preset lowest control voltage.

2. The method of claim 1, wherein the adjusting of the voltage includes setting, by the controller, a lowest control voltage to a sum of the preset lower-limit operational voltage of the inverter and a preset offset voltage value.

3. The method of claim 2, wherein the adjusting of the voltage further includes:
   determining, by the controller, whether a voltage value acquired by subtracting the preset lower-limit operational voltage from the inverter detection voltage is greater than a preset reference voltage value, which is a positive value;
   when the voltage value acquired by the subtracting is greater than the preset reference voltage value, cumulatively adding, by the controller, the voltage value a first reference number of times, which is set in advance;
   calculating, by the controller, an average voltage value by dividing the cumulatively added voltage value by the first reference number of times; and
   operating, by the controller, the converter to adjust the voltage on the high-voltage bus to a voltage value acquired by subtracting the average voltage value from the preset lowest control voltage.

4. The method of claim 3, wherein the preset reference voltage value is less than the preset offset voltage value.

5. The method of claim 3, wherein the adjusting of the voltage further includes:
   when the voltage value acquired by the subtracting is less than the preset reference voltage value, determining, by the controller, whether the voltage value acquired by the subtracting is a negative value;
   when the voltage value acquired by the subtracting is a negative value, cumulatively adding, by the controller, the voltage value a second reference number of times, which is set in advance;
   calculating, by the controller, an average voltage value by dividing the cumulatively added voltage value by the second reference number of times; and
   operating, by the controller, the converter to adjust the voltage on the high-voltage bus to a voltage value acquired by subtracting the average voltage value from the lowest control voltage.

6. The method of claim 5, wherein the second reference number of times is less than the first reference number of times.

7. The method of claim 5, wherein the operating of the converter to adjust the voltage on the high-voltage bus includes maintaining, by the controller, the voltage on the high-voltage bus when the voltage value acquired by the subtracting is less than the preset reference voltage value and is a positive value.

* * * * *